US011953875B2

(12) United States Patent
Nagayama et al.

(10) Patent No.: US 11,953,875 B2
(45) Date of Patent: Apr. 9, 2024

(54) CUTTING PROCESSING MACHINE AND CUTTING PROCESSING METHOD

(71) Applicant: Amada Co., Ltd., Kanagawa (JP)

(72) Inventors: Takehiro Nagayama, Kanagawa (JP); Kazuhiro Kanno, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 883 days.

(21) Appl. No.: 16/979,432

(22) PCT Filed: Mar. 5, 2019

(86) PCT No.: PCT/JP2019/008528
§ 371 (c)(1),
(2) Date: Sep. 9, 2020

(87) PCT Pub. No.: WO2019/176632
PCT Pub. Date: Sep. 19, 2019

(65) Prior Publication Data
US 2021/0080919 A1    Mar. 18, 2021

(30) Foreign Application Priority Data

Mar. 12, 2018 (JP) ................................. 2018-044118

(51) Int. Cl.
*G05B 19/18*     (2006.01)
*B23K 26/08*     (2014.01)
(Continued)

(52) U.S. Cl.
CPC ............ *G05B 19/182* (2013.01); *B23K 26/08* (2013.01); *B23K 26/082* (2015.10); *G05B 19/4155* (2013.01); *G05B 2219/37355* (2013.01)

(58) Field of Classification Search
CPC .............. G05B 19/182; G05B 19/4155; G05B 2219/37355; B23K 26/082; B23K 26/08
See application file for complete search history.

(56) References Cited

U.S. PATENT DOCUMENTS

2018/0117712 A1*  5/2018  Stuhrmann .......... B23K 26/073

FOREIGN PATENT DOCUMENTS

DE        19830237 A1    1/2000
DE   102008053397 A1   12/2009
(Continued)

OTHER PUBLICATIONS

WO 2017199410 A1—translation (Year: 2023).*
(Continued)

*Primary Examiner* — Nathaniel E Wiehe
*Assistant Examiner* — Keith Brian Assante
(74) *Attorney, Agent, or Firm* — Renner, Otto, Boisselle & Sklar, LLP

(57) ABSTRACT

A cutting processing machine includes a processing machine body and an NC device. The NC device includes a tool diameter correction amount calculator, a processing trace calculator, and a driving controller. The processing machine body includes a processing unit and a tool trace controller. In a case where, as a processing condition, an offset amount between a control center point of a tool trace and a center point of a nozzle is set, the processing trace calculator generates a tool trace control signal for causing the control center point to be displaced relative to the center point of the nozzle by the offset amount in a predetermined direction. The processing machine body controls the tool trace based on the tool trace control signal such that the control center point is displaced relative to the center point of the nozzle in the predetermined direction.

8 Claims, 12 Drawing Sheets

(51) Int. Cl.
*B23K 26/082* (2014.01)
*G05B 19/4155* (2006.01)

(56) References Cited

FOREIGN PATENT DOCUMENTS

| | | | |
|---|---|---|---|
| JP | 62-43792 | B | 9/1987 |
| JP | 6-161523 | A | 6/1994 |
| JP | 7-236987 | A | 9/1995 |
| JP | H10328870 | A | 12/1998 |
| JP | 2002-1568 | A | 1/2002 |
| JP | 2005-279730 | A | 10/2005 |
| JP | 4037152 | B | 1/2008 |
| JP | 2011-025272 | A | 2/2011 |
| JP | 2013-154365 | A | 8/2013 |
| JP | 6087483 | B1 | 3/2017 |
| WO | 2015/156119 | A1 | 10/2015 |
| WO | WO-2017199410 | A1 * | 11/2017 |

OTHER PUBLICATIONS

Office Action for corresponding JP Application No. 2020-506417, dated Nov. 4, 2021, with English language translation.
International Search Report for corresponding Application No. PCT/JP2019/008528, dated May 28, 2019.
Written Opinion for corresponding Application No. PCT/JP2019/008528, dated May 28, 2019.
Extended European Search Report for corresponding EP Application No. 19767315.5 dated Dec. 6, 2021.

* cited by examiner

CUTTING PROCESSING MACHINE AND CUTTING PROCESSING METHOD

TECHNICAL FIELD

The present disclosure relates to a cutting processing machine such as a laser processing machine and a cutting processing method for processing a processing object by irradiating the processing object with a laser beam.

BACKGROUND ART

As a cutting processing machine, a laser processing machine has been popular that irradiates a processing object with a laser beam for processing it, and thus, creates a product having a predetermined shape. The laser processing machine performs cutting processing to the processing object in accordance with a tool radius compensation assuming a cut amount by using a laser beam so that a product is created to have a predetermined shape. Patent Literature 1 discloses an example of a laser processing machine that performs the cutting processing to a processing object in accordance with a tool radius compensation.

CITATION LIST

[Patent Literature 1]: Japanese Patent No. 6087483

SUMMARY OF THE INVENTION

In a laser processing machine, in a state where a relative position between a nozzle from which a laser beam is emitted and a processing table on which a processing object is placed is fixed, the laser beam normally has a circular shape, and thus, a cutting processing trace also has a circular shape. Even in a case of a machining center having a plurality of types of rotary tools, in a state where positional coordinates of a rotary tool are fixed, a cutting processing trace normally has a circular shape. In the case of a water jet processing device also, in a state where coordinates of a position from which high-pressure water is emitted are fixed, a cutting processing trace normally has a circular shape. Accordingly, a tool radius compensation assumes that a cutting processing trace in a state where positional coordinates of a cutting tool such as a nozzle, a rotary tool, and high-pressure water are fixed has a circular shape.

Therefore, a cutting processing machine such as a laser processing machine controls a trace in a case where the cutting processing is performed to the processing object by setting an amount corresponding to a radius of a cutting processing trace by a cutting tool or an amount corresponding to a half width of the cutting processing trace to the tool radius compensation amount and shifting the cutting tool by the tool radius compensation amount. Typically, a tool radius compensation of a prior cutting processing machine does not meet a case where a cutting processing trace has a noncircular shape.

An object of an embodiment is to provide a cutting processing machine and a cutting processing method that allow correcting a tool diameter of a cutting tool with high precision even in a case where a cutting processing trace in a state where positional coordinates of a cutting tool are fix has a noncircular shape.

A first aspect of an embodiment provides a cutting processing machine including a processing machine body configured to perform cutting processing to a processing object; and an NC device configured to control the processing machine body; wherein the NC device includes: a tool radius compensation amount calculator configured to generate tool radius compensation information for correcting a tool diameter of a cutting tool used for performing the cutting processing to the processing object based on a processing program and a processing condition set based on product shape information indicating a size and a shape of a final processed product obtained by performing the cutting processing to the processing object; a processing trace calculator configured to generate a tool trace control signal based on the processing program, the processing condition, and the tool radius compensation information; and a driving controller configured to generate a drive control signal for controlling the processing machine body based on the tool trace control signal; wherein the processing machine body includes: a processing unit including a tip attached with a nozzle configured to perform the cutting processing to the processing object by changing a position relative to the processing object; and a tool trace controller configured to control a tool trace that corresponds to the cutting tool and includes a noncircular shape based on the drive control signal; wherein, in a case where, as the processing condition, an offset amount between a control center point that is a reference for controlling the tool trace and a center point of the nozzle is set; the processing trace calculator generates the tool trace control signal for displacing the control center point relative to the center point of the nozzle by the offset amount in a predetermined direction; and the processing machine body controls the tool trace based on the drive control signal such that the control center point is displaced relative to the center point of the nozzle in the predetermined direction.

A second aspect of an embodiment provides a cutting processing method including: generating tool radius compensation information for correcting a tool diameter of a cutting tool used for performing cutting processing to a processing object based on a processing program and a processing condition set based on product shape information indicating a size and a shape of a final processed product obtained by performing the cutting processing to the processing object; generating a tool trace control signal based on the processing program, the processing condition, and the tool radius compensation information; and, generating a drive control signal based on the tool trace control signal; wherein, in a case where, as the processing condition, an offset amount between a center point of a nozzle for performing the cutting processing to the processing object and a control center point that is a reference for controlling a tool trace that corresponds to the cutting tool and includes a noncircular shape is set; generating the tool trace control signal for displacing the control center point relative to the center point of the nozzle by the offset amount in a predetermined direction; and controlling the tool trace based on the drive control signal such that the control center point is displaced relative to the center point of the nozzle in the predetermined direction.

In accordance with a cutting processing machine and a cutting processing method according to an embodiment, even in a case where a cutting processing trace in a state where positional coordinates of a cutting tool are fixed has a noncircular shape, a tool diameter of the cutting tool can be corrected with high precision.

MODES FOR CARRYING OUT THE INVENTION

A cutting processing machine and a cutting processing method according to an embodiment are described below with reference to the accompanying drawings. As an example of the cutting processing machine and the cutting processing method, a laser processing machine and a laser processing method are described.

Figure 1:
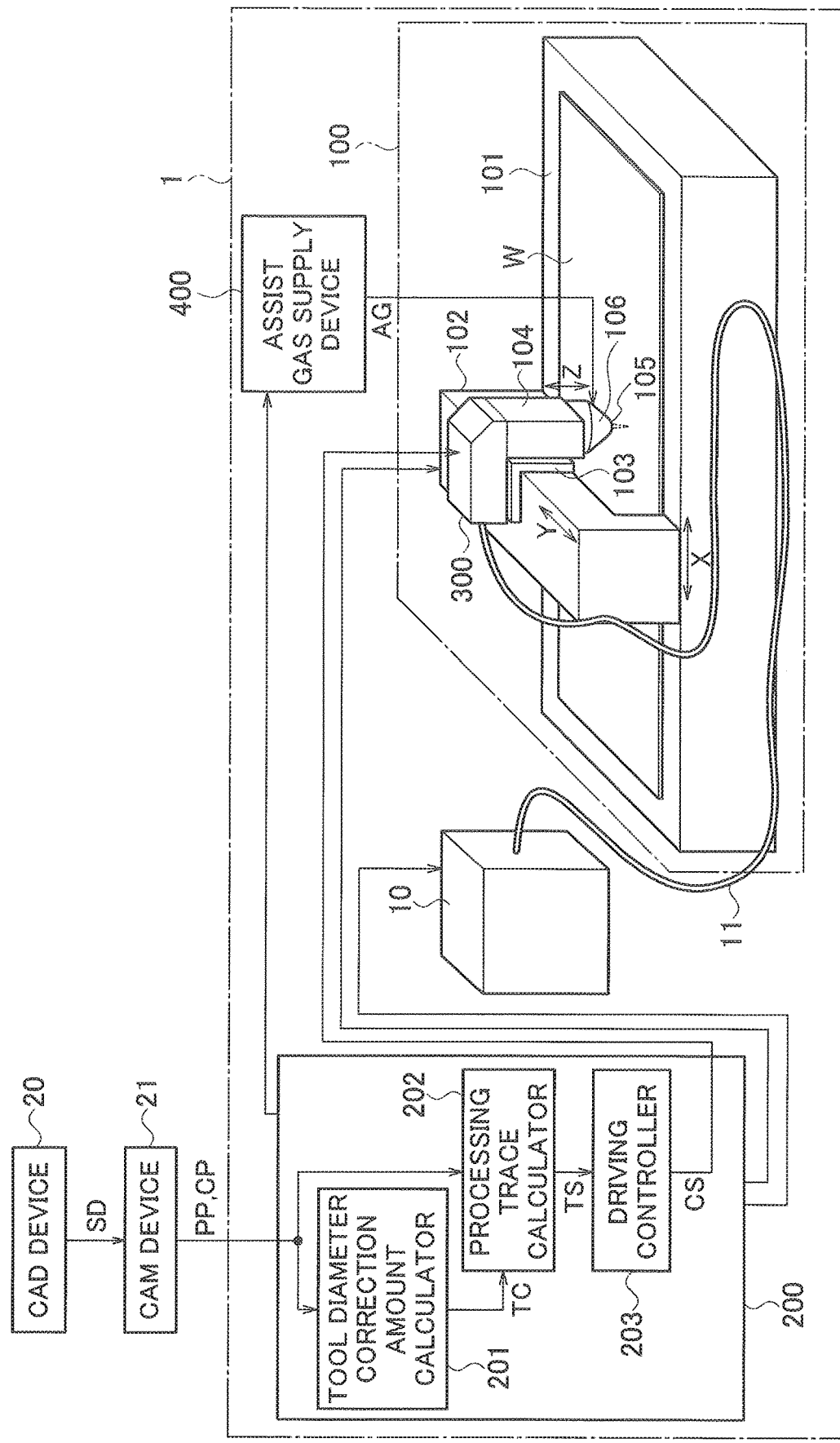
FIG. 1 is a diagram illustrating an example of an entire configuration of a cutting processing machine according to an embodiment.

As illustrated in FIG. 1, a cutting processing machine 1 includes a laser oscillator 10, a processing machine body 100, an NC device (numerical control device) 200, and an assist gas supply device 400. The NC device 200 controls the laser oscillator 10, the processing machine body 100, and the assist gas supply device 400. The assist gas supply device 400 may be provided outside the cutting processing machine 1.

The laser oscillator 10 generates a laser beam to emit the laser beam. The laser beam emitted from the laser oscillator 10 is transmitted to the processing machine body 100 via a process fiber 11. The processing machine body 100 performs cutting processing to a processing object W by irradiating the processing object W with the laser beam and changing a relative position between the processing object W and a beam spot of the laser beam.

As the laser oscillator 10, a laser oscillator that amplifies an excitation beam emitted from a laser diode to emit a laser beam having a predetermined wavelength or a laser oscillator that directly uses a laser beam emitted from a laser diode is preferable. Examples of the laser oscillator 10 include a solid laser oscillator, a fiber laser oscillator, a disk laser oscillator, or a direct diode laser oscillator (DDL oscillator).

The laser oscillator 10 emits a 1 μm band laser beam having a wavelength of 900 nm to 1100 nm. In a case where the fiber laser oscillator and the DDL oscillator are described as examples, the fiber laser oscillator emits a laser beam having a wavelength of 1060 nm to 1080 nm and the DDL oscillator emits a laser beam having a wavelength of 910 nm to 950 nm.

The processing machine body 100 includes a processing table 101 on which the processing object W is placed, a gate type X-axis carriage 102, a Y-axis carriage 103, a processing unit 104, and a tool trace controller 300. The processing object W is steel metal made of stainless steel, for example. A processing object may be iron-based sheet metal other than stainless steel or may be sheet metal such as aluminum, aluminum alloys, copper steel and the like. A laser beam emitted from the laser oscillator 10 is transmitted to the processing unit 104 in the processing machine body 100 via the process fiber 11. A tool trace controller 300 is housed in the processing unit 104.

The X-axis carriage 102 is configured to be movable on the processing table 101 in an X-axis direction. The Y-axis carriage 103 is configured to be movable on the X-axis carriage 102 in a direction of a Y-axis orthogonal to an X-axis. The X-axis carriage 102 and the Y-axis carriage 103 function as a moving mechanism for moving the processing unit 104 along a surface of the processing object W in an X-axis direction, a Y-axis direction, or an arbitrary combination direction of the X-axis and the Y-axis.

Instead of moving, by the processing machine body 100, the processing unit 104 along the surface of the processing object W, it may be configured such that a position of the processing unit 104 is fixed and the processing object W moves. The processing machine body 100 may include a moving mechanism that moves a position of the processing unit 104 relative to the surface of the processing object W.

A nozzle 106 is attached to the processing unit 104. To a tip portion of the nozzle 106, a circular opening 105 is formed. The processing object W is irradiated with a laser beam that is transmitted to the processing unit 104 and then emitted through the opening 105 of the nozzle 106.

The assist gas supply device 400 supplies assist gas AG to the processing unit 104 in the processing machine body 100. The assist gas supply device 400 supplies, to the processing unit 104, nitrogen if the processing object W is stainless steel and oxygen if the processing object W is soft steel as the assist gas AG. The assist gas AG may be mixed gas and a mix ratio thereof can be set in any manner depending on whether an object of the assist gas is the inhibition of oxidation or use of an oxidation reaction heat.

The processing unit 104 in the processing machine body 100, at the time of performing the cutting processing to the processing object W, irradiates the processing object W with the laser beam through the opening 105 of the nozzle 106 and jets the assist gas AG onto the processing object W. The assist gas AG discharges molten metal obtained by melting of the processing object W by the laser beam.

The tool trace controller 300 functions as a beam oscillation mechanism that causes, a laser beam propagated in the processing unit 104 and is emitted through the opening 105 to be oscillated in a noncircular oscillation pattern. By the tool trace controller 300 causing the laser beam to be oscillated in the noncircular oscillation pattern, the processing unit 104 performs the cutting processing to the processing object W in accordance with a noncircular tool trace. An example of a specific configuration of the tool trace controller 300 and how the tool trace controller 300 causes the beam spot of the laser beam to be oscillated in the noncircular oscillation pattern are described later. The tool trace indicates a graphic drawn based on a beam trace made by the oscillation of the beam oscillated in the noncircular oscillation pattern during a defined period of time and indicates an oscillating tool shape. That is, normally, a circular laser beam itself emitted from the nozzle 106 is a cutting tool and a tool diameter is corrected by a beam radius, but here, a tool trace of a graphic drawn in an oscillation pattern is assumed to be a cutting tool. A cutting processing trace in a state where a relative position between the nozzle 106 and the processing table 101 is fixed corresponds to a tool trace.

A CAD (Computer Aided Design) device 20 generates product shape data (CAD data) SD based on product shape information indicating a size and a shape of a final processed product obtained by performing the cutting processing to the processing object W and outputs the generated data to a CAM (computer aided manufacturing) device 21. The CAM device 21, based on the product shape data SD, generates a processing program (NC data) PP used by the cutting processing machine 1 to perform the cutting processing to the processing object W and specifies a processing condition CP. That is, the processing program PP and the processing condition CP are set based on product shape information indicating a size and a shape of a final processed product.

The processing program PP includes a G code indicated by G41 (a left-side tool radius compensation) for controlling the trace of the cutting tool by shifting the trace on the left side of an advancement direction of the cutting processing by the tool radius compensation amount or G42 (a right-side tool radius compensation) for controlling the trace of the cutting tool by shifting the trace on the right side of the advancement direction of the cutting processing by the tool radius compensation amount.

The CAM device 21, as the processing condition CP, specifies the tool trace corresponding to the cutting tool. The tool trace has, for example, a noncircular shape. The CAM device 21 can set an offset amount between the control center point of the tool trace and the center point of the nozzle 106. The processing condition CP includes the tool trace control information specified with the tool trace and set with the offset amount between the control center point of the tool trace and the center point of the nozzle 106. The control center point is the center of a laser beam in a case of a tool radius compensation in a prior laser processing, and in the present embodiment, is the center position for controlling the cutting tool for a cutting line (a cutting position) that is a boundary between a cutting tool and a product in a case where a tool trace is a cutting tool having a noncircular shape.

The processing condition CP includes processing target information specified with material parameters of materials, thicknesses and the like of the processing object W. Further, the processing condition CP includes cutting processing information indicating processing parameters of outputs of a laser beam, a processing speed, diameters (nozzle diameters) of the opening 105 of the nozzle 106 and the like, assist gas conditions and the like. That is, the processing condition CP includes the tool trace control information, the processing target information, and the cutting processing information.

The CAM device 21 outputs the processing program PP and the processing condition CP to the NC device 200 in the cutting processing machine 1. The NC device 200, based on the processing program PP and the processing condition CP, controls the laser oscillator 10 and the assist gas supply device 400. The NC device 200 moves the nozzle 106 to an objective position by, based on the processing program PP and the processing condition CP, controlling the processing machine body 100 and driving the X-axis carriage 102 and the Y-axis carriage 103.

The NC device 200 controls the trace of the beam spot of the laser beam emitted through the opening 105 of the nozzle 106 by, based on the processing program PP and the processing condition CP, controlling the tool trace controller 300 in the processing machine body 100. The trace of the beam spot corresponds to the tool trace. The cutting processing machine 1 can displace the tool trace in the opening 105 of the nozzle 106 in accordance with the offset amount.

The NC device 200 includes a tool radius compensation amount calculator 201, a processing trace calculator 202, and a driving controller 203. The tool radius compensation amount calculator 201 and the processing trace calculator 202 receive, from the CAM device 21, the processing program PP and the processing condition CP. The tool radius compensation amount calculator 201, based on the processing program PP and the processing condition CP, generates tool radius compensation information TC for correcting the tool diameter of the cutting tool used for performing the cutting processing to the processing object W.

Figure 2A:
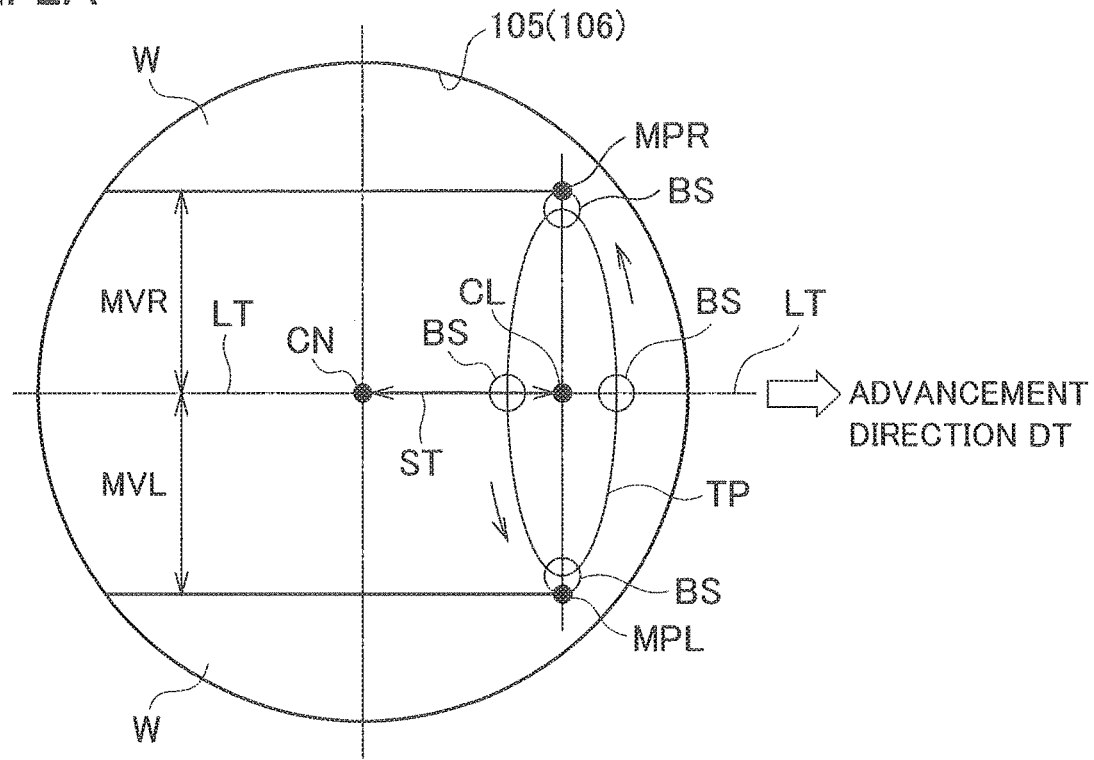
FIG. 2A is a diagram illustrating a relationship between a nozzle and a tool trace.
Figure 2B:
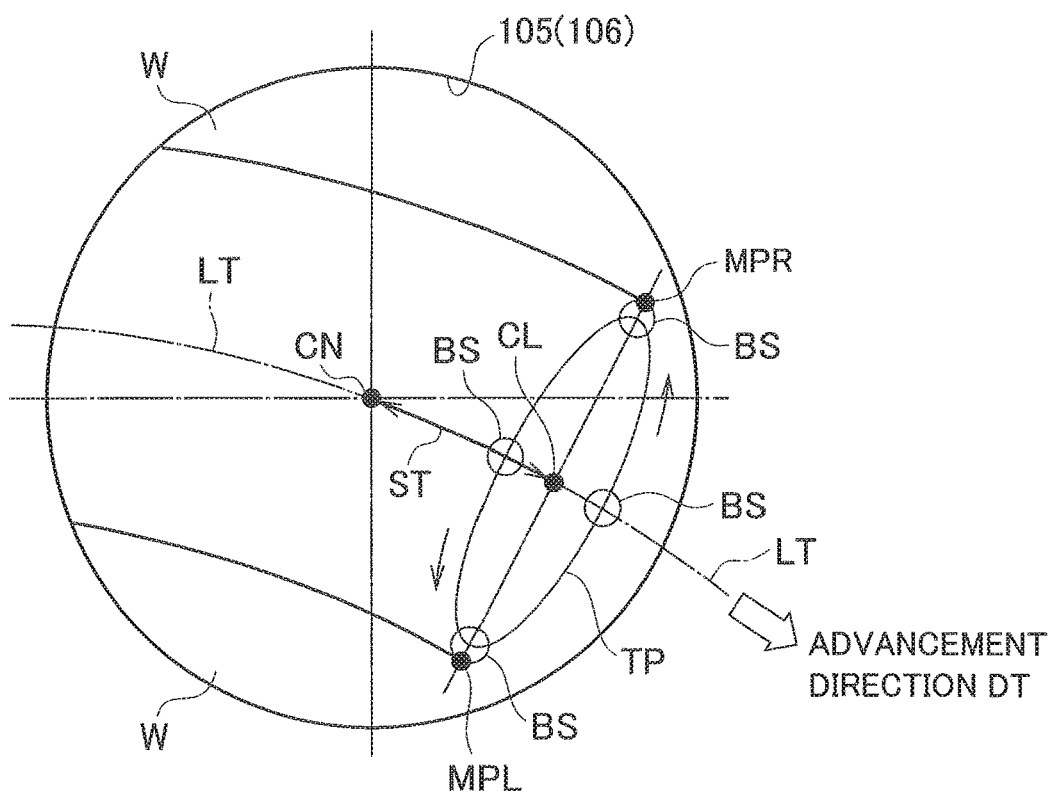
FIG. 2B is a diagram illustrating a relationship between a nozzle and a tool trace.
Figure 2C:
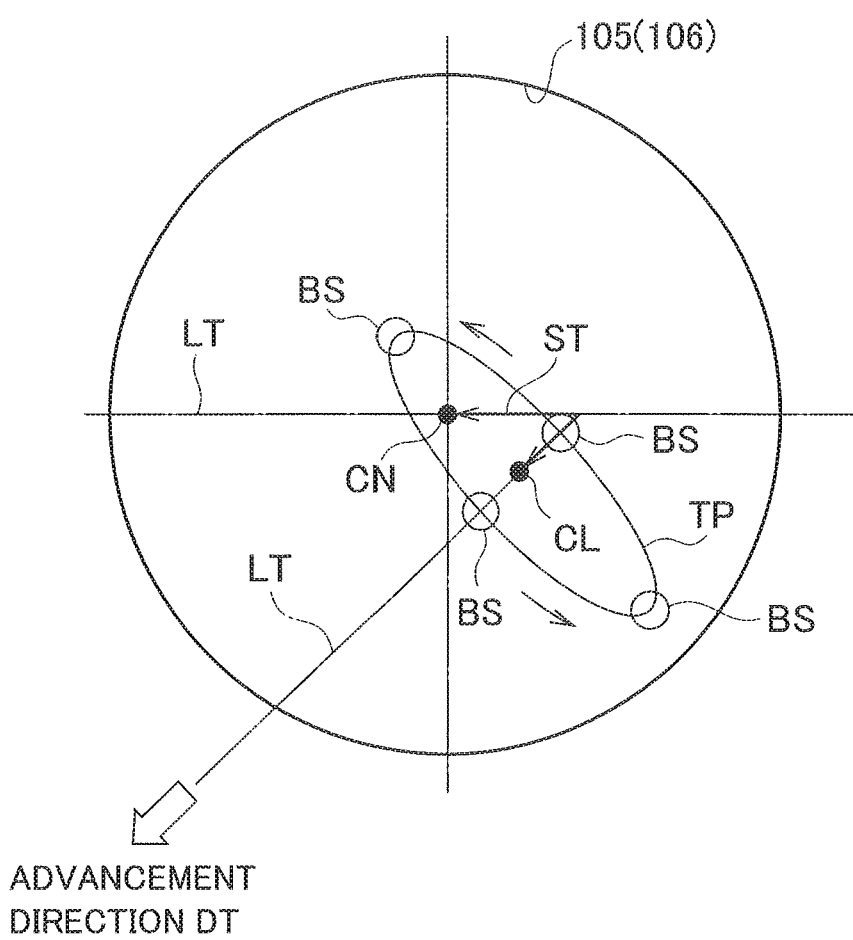
FIG. 2C is a diagram illustrating a relationship between a nozzle and a tool trace.

With reference to FIG. 2A, FIG. 2B, and FIG. 2C, the relationship between the nozzle 106 and the tool trace is described. FIG. 2A, FIG. 2B, and FIG. 2C illustrate the trace (the tool trace) of the beam spot of the laser beam emitted from inside the nozzle 106 through the opening 105 to irradiate the processing object W therewith.

Each reference numeral illustrated in FIG. 2A, FIG. 2B, and FIG. 2C is described. A reference numeral TP indicates a tool trace. The tool trace TP corresponds to the cutting tool used for performing the cutting processing to the processing object W. A shape of the tool trace TP corresponds to a shape of a cutting tool. The tool trace TP has, for example, a noncircular shape.

A reference numeral BS indicates a beam spot of a laser beam with which the processing object W is irradiated. In a case of the laser processing machine, the tool trace TP corresponds to the trace of the beam spot BS of the laser beam. FIG. 2A, FIG. 2B, and FIG. 2C illustrate, as an example of a noncircular trace, the tool trace TP of an oscillation pattern in which the beam spot BS is rotationally oscillated on an ellipse. The oscillation pattern of the tool trace TP may have any free shape including the noncircular shape.

The beam spot BS rotates and moves on the tool trace TP. An arrow illustrated in each of FIG. 2A, FIG. 2B, and FIG. 2C indicates a rotation direction of a beam spot BS. Although FIG. 2A, FIG. 2B, and FIG. 2C illustrate a state where the beam spot BS rotates and moves in a counter-clockwise direction, the beam spot BS may rotate and move in a clockwise direction.

A reference numeral CN indicates the center point of the nozzle 106 (hereinafter referred to as a nozzle center point CN). The nozzle center point CN matches the center point of the opening 105. A reference numeral CL indicates the control center point that is a reference for controlling the tool trace TP. A reference numeral LT indicates a trace in which the tool trace TP moves, and specifically indicates the trace of the control center point CL (hereinafter referred to as a control center trace LT).

A reference numeral DT indicates an advancement direction of the cutting processing (a predetermined direction). The control center trace LT corresponds to a trace in which the control center point CL of the tool trace TP moves in the advancement direction DT. FIG. 2A illustrates a state where the cutting processing is performed to the processing object W in the right direction. FIG. 2B illustrates a state where the cutting processing is performed to the processing object W on a lower right arc. FIG. 2C illustrates a state where the cutting processing is performed to the processing object W in the right direction and further in the lower left direction.

Reference numerals MVL and MVR in FIG. 2A indicate tool radius compensation values. The tool radius compensation values MVL and MVR correspond to a distance from the control center point CL to positions formed with surfaces to be processed MPL and MPR. The positions formed with surfaces to be processed MPL and MPR are positions at which a surface to be processed is formed to the processing object W in a case where the tool trace TP moves in the advancement direction DT of the cutting processing. That is, the positions formed with surfaces to be processed MPL and MPR are positions in the tool trace TP at which a tool diameter becomes maximum. The tool radius compensation value MVL is a parameter in the left-side tool radius compensation, and the tool radius compensation value MVR is a parameter in the right-side tool radius compensation.

A reference numeral ST indicates an offset amount between the control center point CL of the tool trace TP and the nozzle center point CN. The offset amount ST corresponds to a distance (a length) from the nozzle center point CN on the control center trace LT to the control center point CL.

As illustrated in FIG. 2A, in a case where the cutting processing is performed to the processing object W in the right direction, the offset amount ST corresponds to a distance (a length) from the nozzle center point CN to the control center point CL on the control center trace LT in the right direction. As illustrated in FIG. 2B, in a case where the cutting processing is performed to the processing object W on a lower right arc, the offset amount ST corresponds to a distance (a length) from the nozzle center point CN to the control center point CL on the control center trace LT on a lower right arc. Further, as illustrated in FIG. 2C, in a case where the cutting processing is performed to the processing object W in the right direction and further in the lower left direction, the offset amount ST corresponds to a distance (a length) obtained by adding a distance (a length) on the control center trace LT in the right direction and a distance (a length) on the control center trace LT in the lower left direction, the added distance being in a range from the nozzle center point CN to the control center point CL.

The tool radius compensation amount calculator 201 recognizes the tool trace TP included in the processing condition CP. The tool radius compensation amount calculator 201 recognizes whether the offset amount ST is set to the processing condition CP as the tool trace control information.

In a case where it is recognized that the offset amount ST is not set to the processing condition CP, the tool radius compensation amount calculator 201, based on the recognized tool trace TP, the trace NP of the nozzle 106 (hereinafter referred to as a nozzle trace NP), and the advancement direction DT of the cutting processing, generates the tool radius compensation information TC in which the control center point CL of the tool trace TP matches the nozzle center point CN. The nozzle trace NP is, specifically the trace of the nozzle center point CN.

In a case where it is recognized that the offset amount ST is set to the processing condition CP, the tool radius compensation amount calculator 201, based on the recognized tool trace TP, the nozzle trace NP, the advancement direction DT of the cutting processing, and the offset amount ST, generates the tool radius compensation information TC in which the control center point CL of the tool trace TP is displaced by the offset amount ST relative to the nozzle center point CN in the advancement direction DT of the cutting processing.

In a case where the offset amount ST is set to the processing condition CP, the tool radius compensation information TC includes the nozzle trace NP (including the nozzle center point CN), the tool trace TP (including the control center point CL), the control center trace LT, the tool radius compensation values MVL and MVR, and the offset amount ST.

The tool radius compensation amount calculator 201 outputs, to the processing trace calculator 202, the tool radius compensation information TC including pieces of correction information of both in the left-side tool radius compensation and the right-side tool radius compensation. The processing trace calculator 202 receives, from the CAM device 21, the processing program PP and the processing condition CP and receives, from the tool radius compensation amount calculator 201, the tool radius compensation information TC. The processing trace calculator 202 translates a G code included in the processing program PP. The processing program PP may include a robot language or the like instead of the G code.

The processing trace calculator 202, based on the translation result, determines a cutting processing correction condition of either one of a case where the cutting processing is performed in the left-side tool radius compensation and a case where the cutting processing is performed in the right-side tool radius compensation.

The processing trace calculator 202, based on the processing program PP, the processing condition CP, the tool radius compensation information TC, and the determined cutting processing correction condition, generates a tool trace control signal TS for displacing the control center point CL by the offset amount ST relative to the nozzle center point CN in the advancement direction DT of the cutting processing. The processing trace calculator 202 outputs the tool trace control signal TS to the driving controller 203. The driving controller 203, based on the tool trace control signal TS, generates a drive control signal CS for controlling the processing machine body 100. The driving controller 203 outputs the drive control signal CS to the processing machine body 100.

In a case where the cutting processing is performed in the left-side tool radius compensation, the driving controller 203 generates the drive control signal CS based on the nozzle trace NP, the tool trace TP, the control center trace LT, the tool radius compensation value MVL, and the offset amount ST. Alternatively, in a case where the cutting processing is performed in the right-side tool radius compensation, the driving controller 203 generates the drive control signal CS based on the nozzle trace NP, the tool trace TP, the control center trace LT, the tool radius compensation value MVR, and the offset amount ST.

The driving controller 203, in accordance with the drive control signal CS, controls the X-axis carriage 102, the Y-axis carriage 103, and the tool trace controller 300 included in the processing machine body 100. The processing machine body 100, based on the drive control signal CS, causes the X-axis carriage 102 and the Y-axis carriage 103 to be driven and causes the nozzle 106 to be moved on the nozzle trace NP. The tool trace controller 300, based on the drive control signal CS, controls the trace of the beam spot BS of the laser beam emitted through the opening 105 of the nozzle 106.

Figure 3:
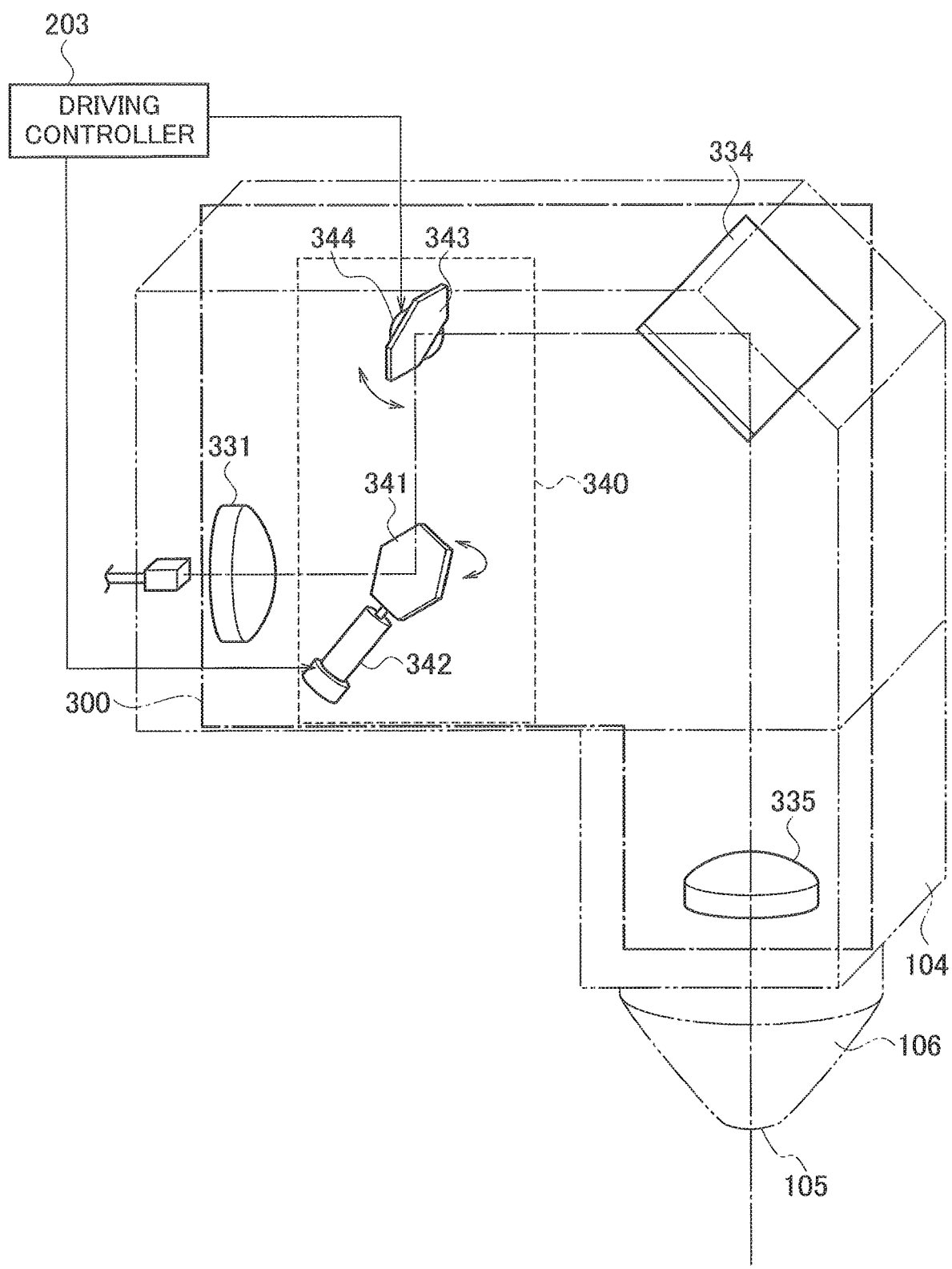
FIG. 3 is a diagram illustrating an example of a configuration of a tool trace controller.

With reference to FIG. 3, an example of a specific configuration of the tool trace controller 300 and an example of how the tool trace controller 300 causes the beam spot BS of the laser beam to be oscillated in a noncircular oscillation pattern are described.

As illustrated in FIG. 3, the tool trace controller 300 is housed in the processing unit 104. The tool trace controller 300 includes a collimator lens 331, a galvano scanner unit 340, a bend mirror 334, and a focusing lens 335. The collimator lens 331 converts the laser beam emitted from the process fiber 11 into parallel light (collimated light).

The galvano scanner unit 340 includes a scanning mirror 341 (a first scanning mirror), a driver 342 (a first driver) that rotates and drives the scanning mirror 341, a scanning mirror 343 (a second scanning mirror), and a driver 344 (a second driver) that rotates and drives the scanning mirror 343.

The driver 342, under a control of the driving controller 203, can cause the scanning mirror 341 to be driven and reciprocated in a predetermined direction (for example, an X-direction) in a predetermined angle range. The scanning mirror 341 reflects the laser beam that has been converted into the parallel light by a collimator lens 321 to the scanning mirror 343.

The driver 344, under control of the driving controller 203, can cause the scanning mirror 343 to be driven and reciprocated in a predetermined angle range in a direction different from the direction in which the scanning mirror 341 is driven (for example, a Y-direction). The scanning mirror 343 reflects the laser beam reflected from the scanning mirror 341 to the bend mirror 334.

The bend mirror 334 reflects the laser beam reflected from the scanning mirror 343 downward in a direction of a Z-axis perpendicular to the X-axis and the Y-axis. The focusing lens 335 focuses the laser beam reflected from the bend mirror 334 and irradiates the processing object W with the laser beam.

By causing either one or both of the scanning mirror 341 and the scanning mirror 343 to be oscillated and reciprocated at high speed, for example, at 1000 Hz or more, the galvano scanner unit 340 can cause the tool trace TP to have various types of noncircular shapes. That is, by focusing (condensing) a laser beams having a constant light intensity or more to a plurality of points per unit time, a shape of a tool that substantially contributes to processing of the processing object W by being in contact therewith may be set in any manner such as various types of noncircular shapes.

With reference to FIG. 4, FIG. 5A, FIG. 5B, FIG. 5C, FIG. 5D, FIG. 5E, FIG. 6, FIG. 7, and FIG. 8, a method for controlling the tool trace TP according to Example 1 in the method for performing the cutting processing to the processing object W is described.

Example 1

Figure 4:
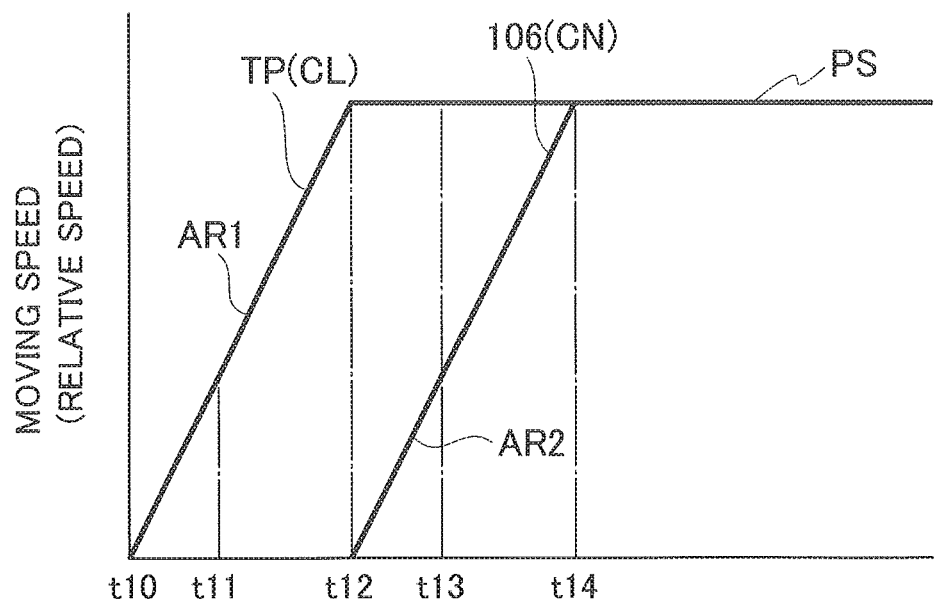
FIG. 4 is a diagram illustrating a relationship between a moving speed of a nozzle and a moving speed of a tool trace at the time of starting controlling the tool trace.

FIG. 4 illustrates a relationship between a moving speed of the nozzle 106 (specifically, the nozzle center point CN) and a moving speed of the tool trace TP (specifically, the control center point CL) at the time of starting controlling the tool trace TP. In FIG. 4, a vertical axis represents the moving speed (a relative speed) of the nozzle 106 (the nozzle center point CN) and the moving speed (a relative speed) of the tool trace TP (the control center point CL) and a horizontal axis represents a time axis.

FIG. 5A, FIG. 5B, FIG. 5C, FIG. 5D, and FIG. 5E illustrate relationships between the nozzle 106 (the opening 105) and the tool trace TP at respective time points t10, t11, t12, t13, and t14 illustrated in FIG. 4. Each of FIG. 5A, FIG. 5B, FIG. 5C, FIG. 5D, and FIG. 5E corresponds to FIG. 2A and illustrates a state where the cutting processing is performed to the processing object W in the right direction.

Figure 5A:
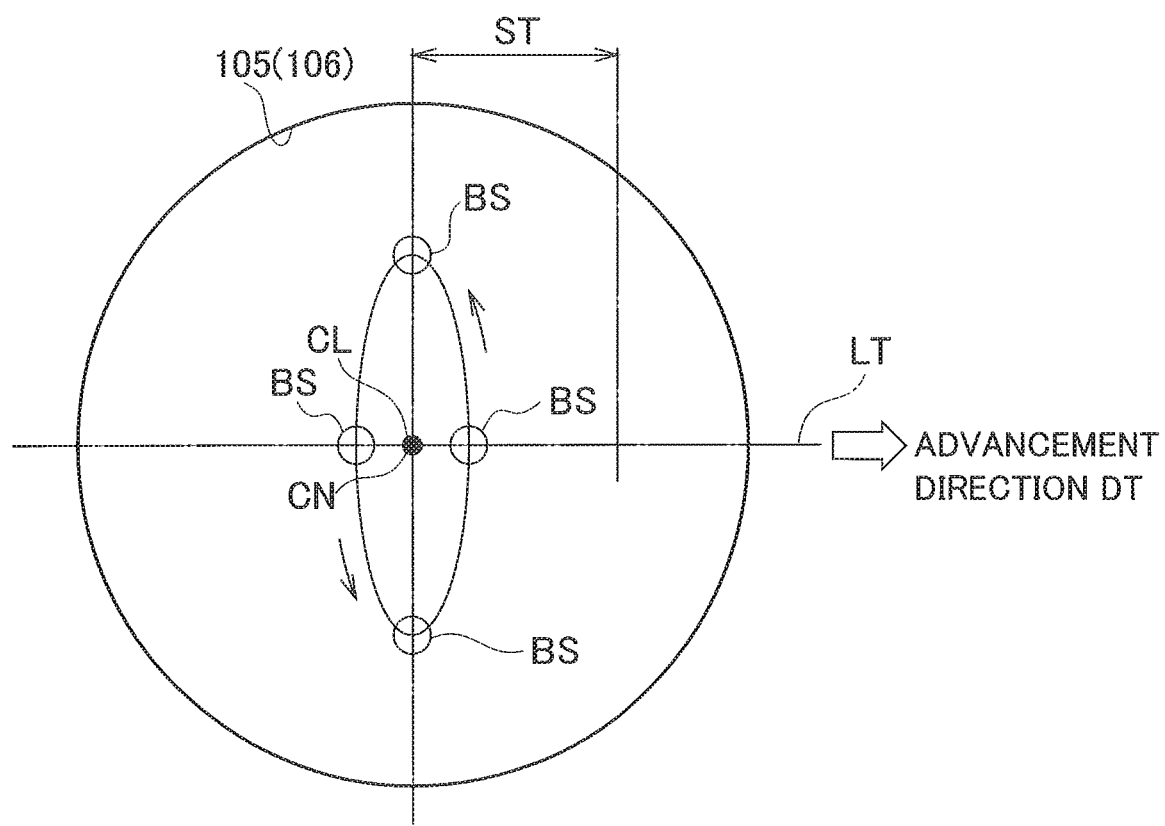
FIG. 5A is a diagram illustrating a relationship between a nozzle and a tool trace.

At the time point t10 illustrated in FIG. 4, the processing machine body 100 in the cutting processing machine 1 starts controlling the tool trace TP based on the drive control signal CS. At the time point t10, the nozzle 106 and the tool trace TP are in a stopped state. At the time point t10, as illustrated in FIG. 5A, the control center point CL of the tool trace TP is in a state to be matched with the nozzle center point CN.

The cutting processing machine 1 controls the tool trace TP such that the control center point CL is displaced relative to the nozzle center point CN in the advancement direction DT of the cutting processing. The cutting processing machine 1 starts controlling the tool trace TP, at the time point t10, such that the control center point CL moves in the advancement direction DT with a first acceleration AR1.

Figure 5B:
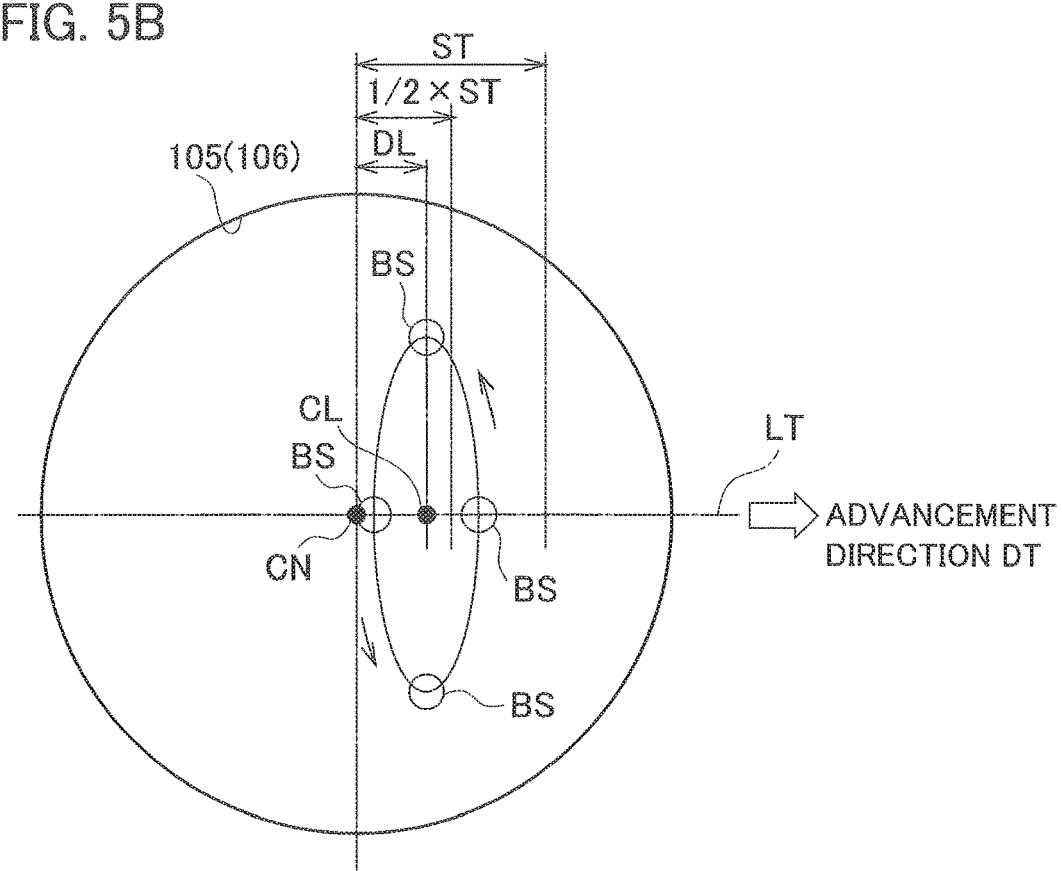
FIG. 5B is a diagram illustrating a relationship between a nozzle and a tool trace.

At the time point t11 following the time point t10, the tool trace TP (the control center point CL) is in the middle of movement with the first acceleration AR1 in the advancement direction DT and the nozzle 106 is in a stopped state. At the time point t11, as illustrated in FIG. 5B, a distance DL from the nozzle center point CN to the control center point CL on the control center trace LT is less than the half of the offset amount ST (DL<½×ST). The distance DL corresponds to a displacement amount of the control center point CL relative to the nozzle center point CN on the control center trace LT.

At the time point t12 following the time point t11, the cutting processing machine 1 causes the tool trace TP (the control center point CL) moving with the first acceleration AR1 to be moved in the advancement direction DT at a predetermined speed (at a constant speed) PS. During a time period from the time point t10 to the time point t12, the nozzle 106 is in a stopped state. The cutting processing machine 1, at the time point t12, starts moving the nozzle 106 such that the nozzle center point CN moves in the advancement direction DT with a second acceleration AR2.

Figure 5C:
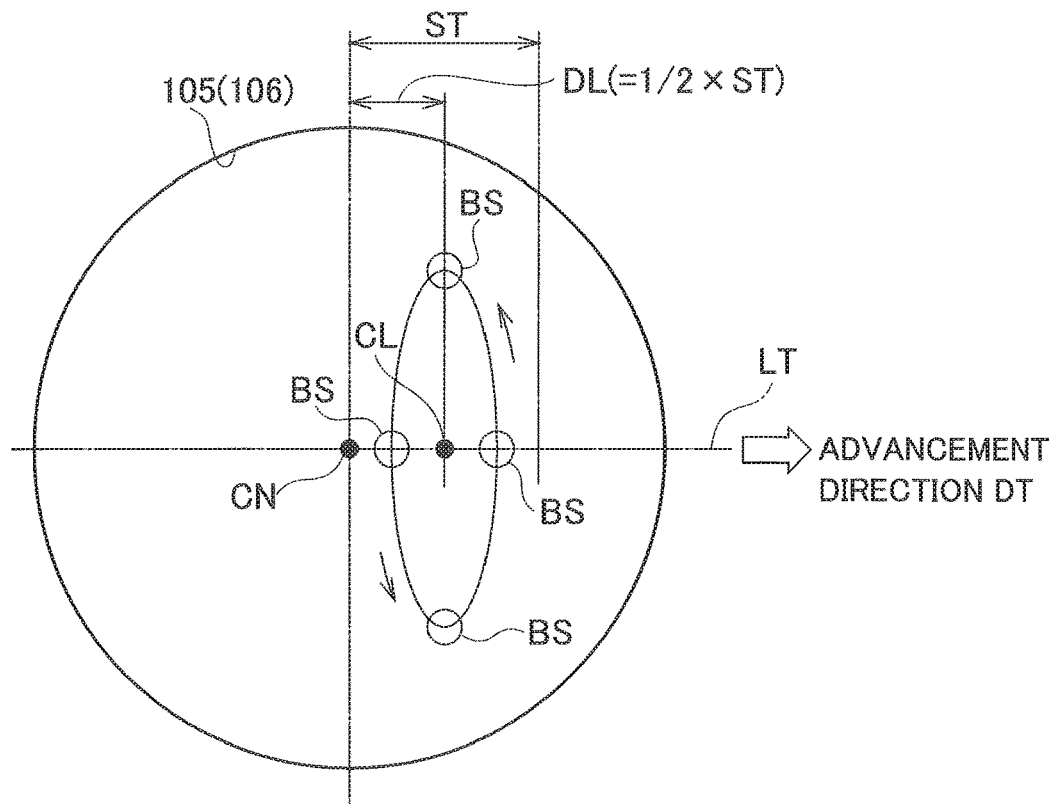
FIG. 5C is a diagram illustrating a relationship between a nozzle and a tool trace.

FIG. 4 illustrates a case where the first acceleration AR1 of the tool trace TP (the control center point CL) and the second acceleration AR2 of the nozzle 106 (the nozzle center point CN) are the same (AR1=AR2) in the advancement direction DT. At the time point t12, as illustrated in FIG. 5C, the distance DL from the nozzle center point CN to the control center point CL on the control center trace LT is half of the offset amount ST ½ (DL=½×ST).

Figure 5D:
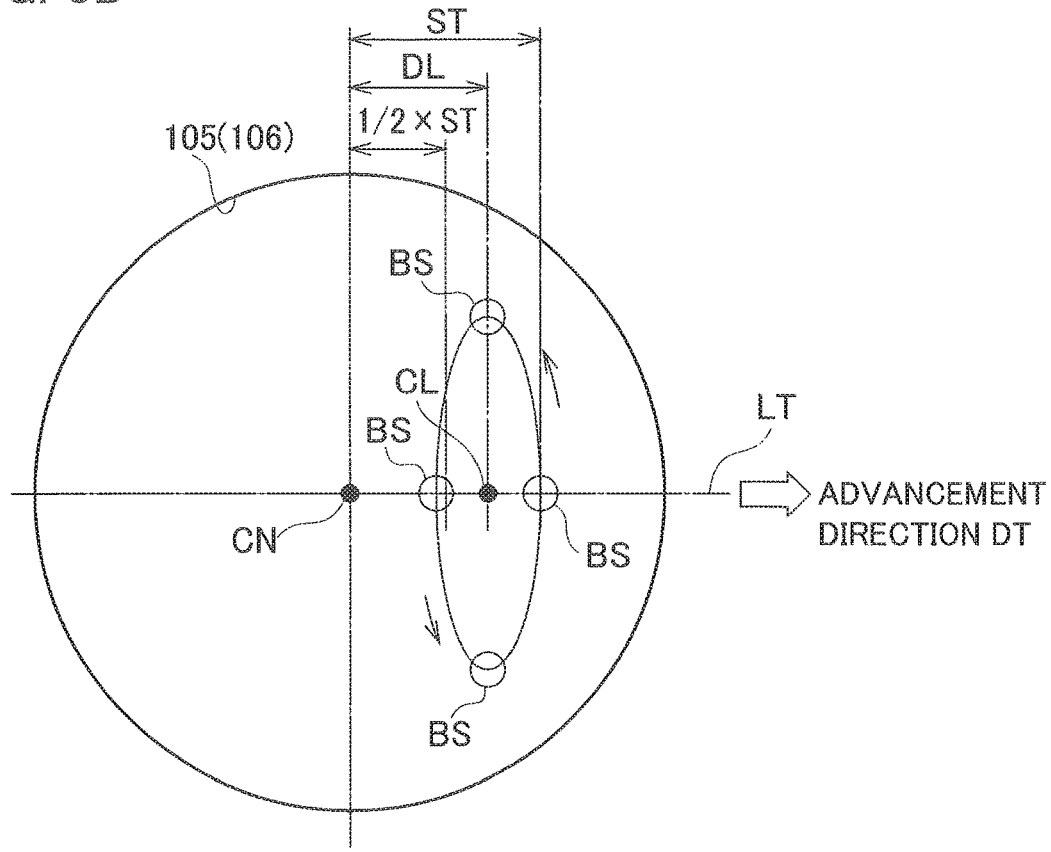
FIG. 5D is a diagram illustrating a relationship between a nozzle and a tool trace.

At the time point t13 following the time point t12, the tool trace TP (the control center point CL) is in the middle of movement at the predetermined speed PS in the advancement direction DT and the nozzle 106 (the nozzle center point CN) is in the middle of movement with the second acceleration AR2 in the advancement direction DT. At the time point t13, as illustrated in FIG. 5D, the distance DL from the nozzle center point CN to the control center point CL on the control center trace LT is longer than half of the offset amount ST and is shorter than the offset amount ST (½×ST<DL<ST).

Figure 5E:
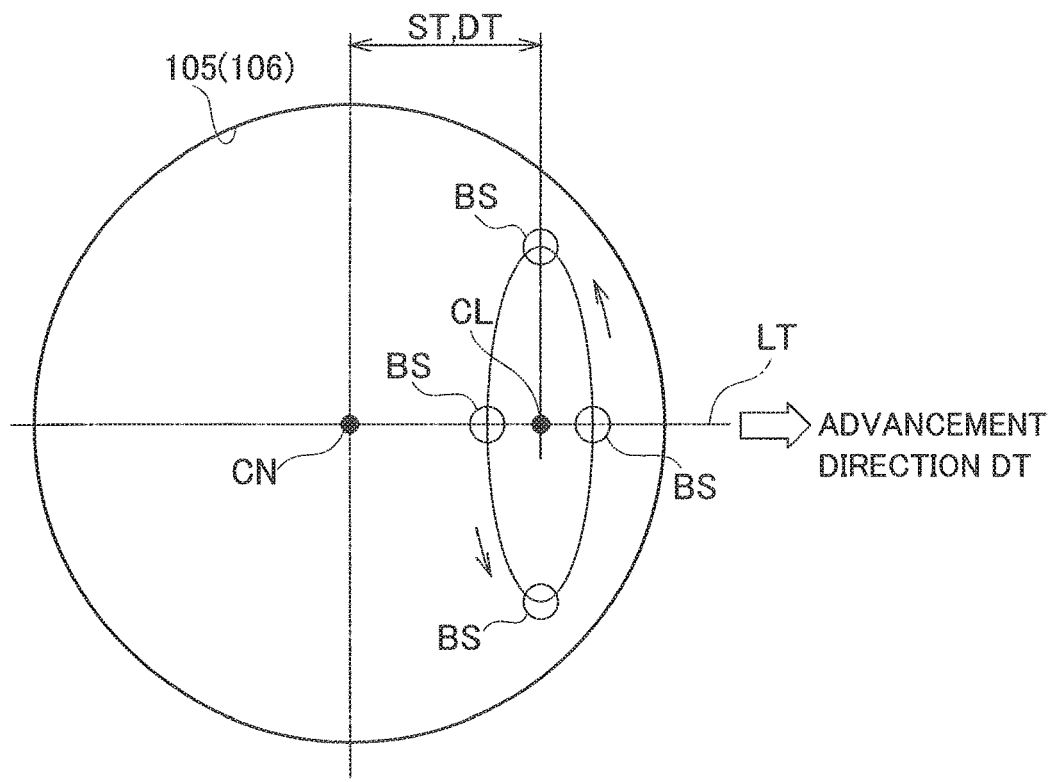
FIG. 5E is a diagram illustrating a relationship between a nozzle and a tool trace.

At the time point t14 following the time point t13, as illustrated in FIG. 5E, the distance DL from the nozzle center point CN to the control center point CL matches the offset amount ST. That is, the control center point CL is in a state to be displaced relative to the nozzle center point CN by the offset amount ST in the advancement direction DT of the cutting processing.

The cutting processing machine 1, at the time point t14, causes the nozzle 106 (the nozzle center point CN) moving with the second acceleration AR2 to be moved in the advancement direction DT at the predetermined speed PS. At the time point t14 or thereafter, the cutting processing machine 1 keeps the offset amount ST between the nozzle 106 and the tool trace TP constant and moves the nozzle 106 and the tool trace TP in the advancement direction DT at the same speed PS. Accordingly, at the time point t14 or thereafter, the cutting processing machine 1 performs the cutting processing to the processing object W in a state where the offset amount ST between the tool trace TP (the control center point CL) and the nozzle 106 (the nozzle center point CN) is kept constant.

Figure 6:
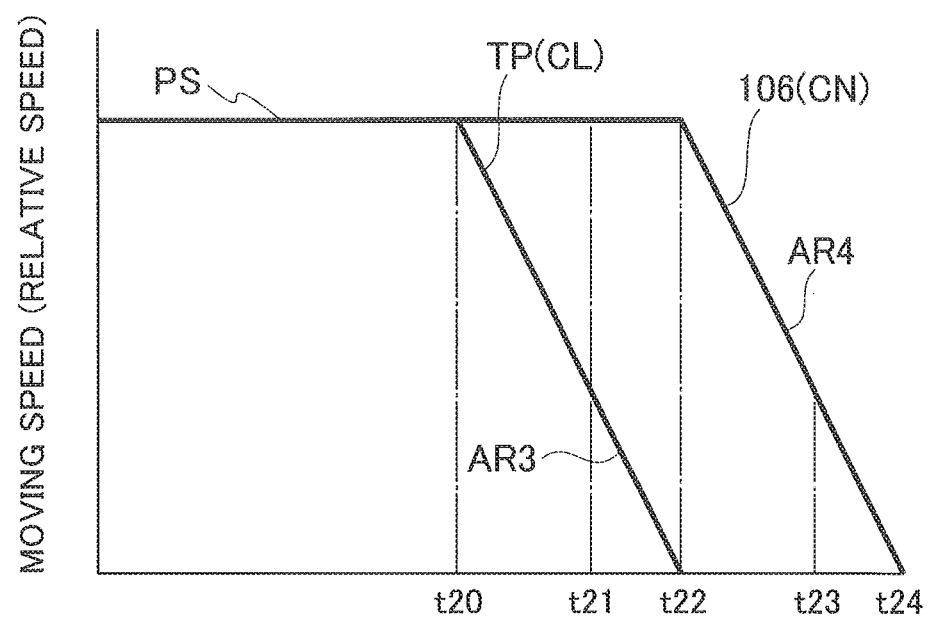
FIG. 6 is a diagram illustrating a relationship between a moving speed of a nozzle and a moving speed of a tool trace at the time of ending controlling the tool trace.

FIG. 6 illustrates a relationship between a moving speed of the nozzle 106 (specifically, the nozzle the center point (CN) and a moving speed of the tool trace TP (specifically, the control center point CL) at the end of the control of the tool trace TP. In FIG. 6, a vertical axis represents the moving speed (the relative speed) of the nozzle 106 (the nozzle center point CN) and the moving speed (the relative speed) of the tool trace TP (the control center point CL) and a horizontal axis represents a time axis. FIG. 6 corresponds to FIG. 4.

FIG. 5E, FIG. 5D, FIG. 5C, FIG. 5B, and FIG. 5A illustrate relationships between the nozzle 106 (the opening 105) and the tool trace TP at the respective time points t20, t21, t22, t23, and t24 illustrated in FIG. 6.

During a time period from the time point t14 illustrated in FIG. 4 to the time point t20 illustrated in FIG. 6, as illustrated in FIG. 5E, the cutting processing machine 1 keeps the offset amount ST between the nozzle 106 (the nozzle center point CN) and the tool trace TP (the control center point CL) constant and causes the nozzle 106 (the nozzle center point CN) and the tool trace TP (the control center point CL) to be moved in the advancement direction DT at the same speed PS.

During a time period from the time point t14 to the time point t20, the distance DL from the nozzle center point CN to the control center point CL matches the offset amount ST. That is, the cutting processing machine 1, during a time period from the time point t14 to the time point t20, performs the cutting processing to the processing object W in a state where the offset amount ST between the tool trace TP (the control center point CL) and the nozzle 106 (the nozzle center point CN) is kept constant.

The cutting processing machine 1, at the time point t20, causes the tool trace TP (the control center point CL) moving at the predetermined speed PS to be deaccelerated in the advancement direction DT with a third acceleration AR3 that is a negative acceleration. At the time point t20, the nozzle 106 is in the middle of movement at the predetermined speed PS in the advancement direction DT.

At the time point t21 following the time point t20, the nozzle 106 is in the middle of movement at the predetermined speed PS in the advancement direction DT and the tool trace TP is in the middle of deceleration with the third acceleration AR3 in the advancement direction DT. At the time point t21, as illustrated in FIG. 5D, the distance DL from the nozzle center point CN to the control center point CL on the control center trace LT is longer than half of the offset amount ST and is shorter than the offset amount ST (½×ST<DL<ST).

The cutting processing machine 1, at the time point t22 following the time point t21, stops the movement of the tool trace TP that deaccelerates with the third acceleration AR3 in the advancement direction DT. The cutting processing machine 1, at the time point t22, causes a laser beam oscillation to be stopped and also causes an irradiation of the processing object W with a laser beam to be stopped. During a time period from the time point t14 to the time point t22, the nozzle 106 moves at the predetermined speed PS in the advancement direction DT. The cutting processing machine 1, at the time point t22, causes the nozzle 106 (the nozzle center point CN) moving at the predetermined speed PS to be deaccelerated in the advancement direction DT with a fourth acceleration AR4 that is a negative acceleration.

FIG. 6 illustrates a case where the third acceleration AR3 of the tool trace TP (the control center point CL) and the fourth acceleration AR4 of the nozzle 106 (the nozzle center point CN) are the same in the advancement direction DT. At the time point t22, as illustrated in FIG. 5C, the distance DL from the nozzle center point CN to the control center point CL on the control center trace LT is the half of the offset amount ST (DL=½×ST).

At the time point t23 following the time point t22, the nozzle 106 is in the middle of deceleration with the fourth acceleration AR4 in the advancement direction DT. At the time point t23, as illustrated in FIG. 5B, the distance DL from the nozzle center point CN to the control center point CL on the control center trace LT is less than the half of the offset amount ST (DL<½×ST). The cutting processing machine 1, at the time point t24 following the time point t23, stops the movement of the nozzle 106 and ends the cutting processing performed to the processing object W. At the time point t24, as illustrated in FIG. 5A, a state becomes a state in which the control center point CL of the tool trace TP matches the nozzle center point CN that is an initial state.

Figure 7:
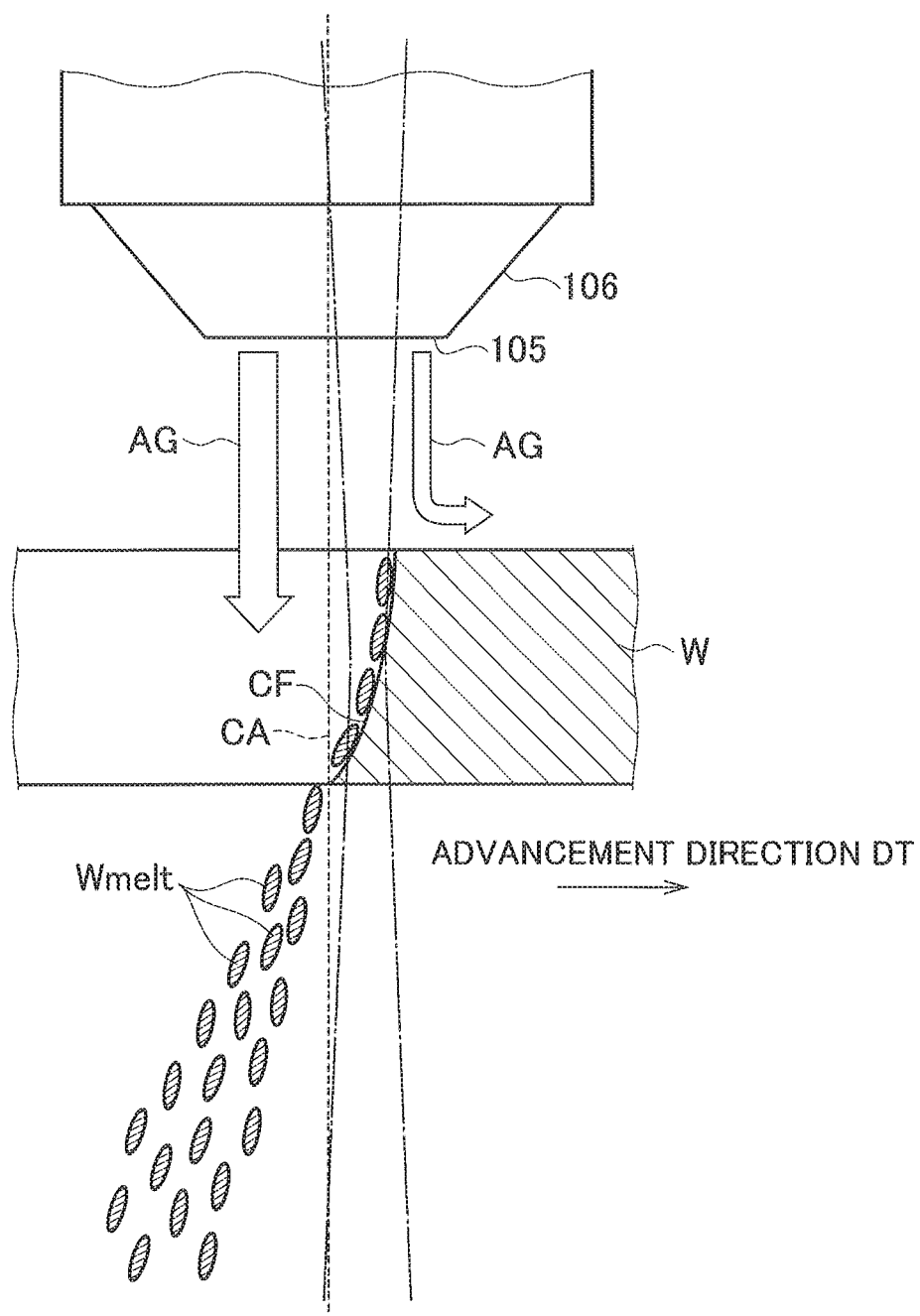
FIG. 7 is a partially broken side view schematically illustrating the flow of assist gas in a case where a tool trace is displaced relative to a center point of a nozzle in an advancement direction of cutting processing.
Figure 8:
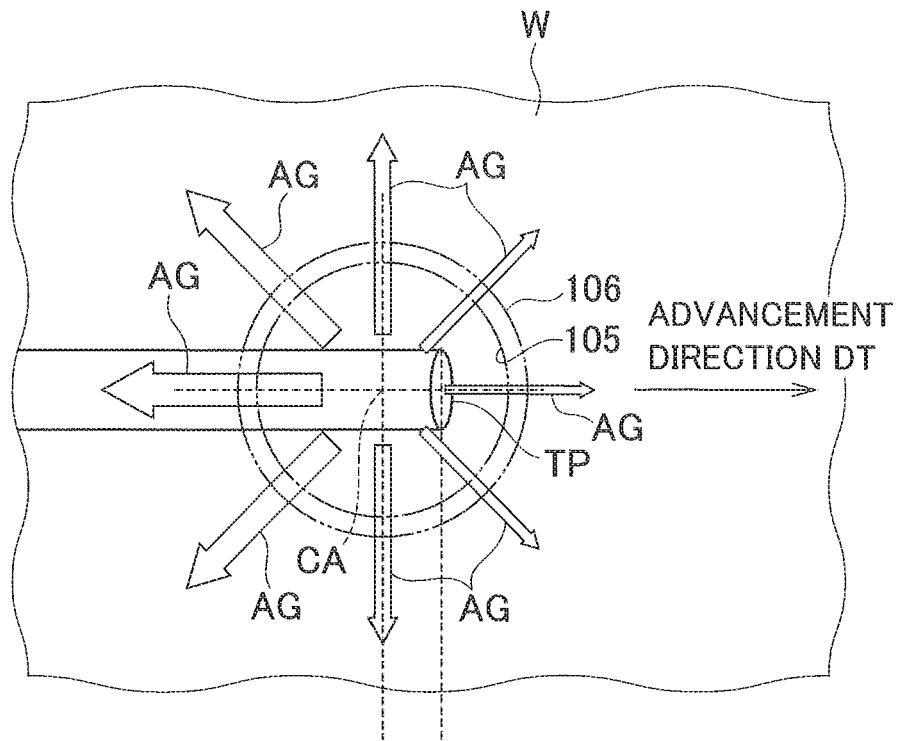
FIG. 8 is a partially broken plan view schematically illustrating the flow of assist gas in a case where a tool trace is displaced relative to a center point of a nozzle in an advancement direction of cutting processing.

In a case where the processing condition CP is set with an offset amount ST between a control center point of a tool trace and a center point of a nozzle, the cutting processing machine 1 performs the cutting processing to the processing object W in a state where the tool trace TP is displaced relative to the nozzle center point CN in accordance with the offset amount ST in the advancement direction DT of the cutting processing. FIG. 7 and FIG. 8 illustrate a state where the processing machine body 100 causes the tool trace TP to be displaced relative to a central axis of the nozzle 106 in the advancement direction of the cutting processing and performs the cutting processing to the processing object W. A reference numeral CA illustrated in FIG. 7 and FIG. 8 indicates a central axis of the nozzle 106 through the nozzle center point CN (hereinafter referred to as a nozzle central axis CA).

In FIG. 7 and FIG. 8, the assist gas AG supplied from the assist gas supply device 400 to the processing machine body 100 is jetted onto the processing object W through the opening 105 of the nozzle 106. The processing machine body 100 performs the cutting processing to the processing object W in a state where the tool trace TP is displaced relative to the nozzle center point CN in accordance with the offset amount ST in the advancement direction DT of the cutting processing. Therefore, it is possible to increase the amount of assist gas AG acting to the molten metal Wmelt generated to a rear side of the advancement direction DT. This can improve discharge properties of the molten metal Wmelt.

With reference to FIG. 5A, FIG. 5B, FIG. 5D, FIG. 5E, FIG. 9 and FIG. 10, a method for controlling the tool trace TP according to Example 2 in the method for performing the cutting processing to the processing object W is described.

Example 2

Figure 9:
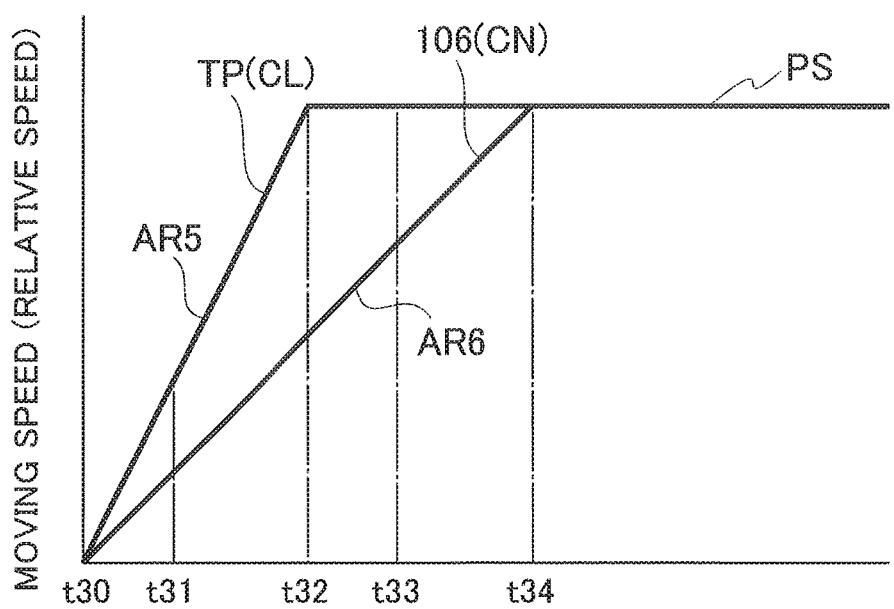
FIG. 9 is a diagram illustrating a relationship between a moving speed of a nozzle and a moving speed of a tool trace at the time of starting controlling the tool trace.

FIG. 9 illustrates a relationship between a moving speed of the nozzle 106 (specifically, the nozzle center point CN) and a moving speed of the tool trace TP (specifically, the control center point CL) at the time of starting controlling the tool trace TP. In FIG. 9, a vertical axis represents the moving speed (the relative speed) of the nozzle 106 (the nozzle center point CN) and the moving speed (the relative speed) of the tool trace TP (the control center point CL) and a horizontal axis represents a time axis. FIG. 9 corresponds to FIG. 4. FIG. 5A, FIG. 5B, FIG. 5D, and FIG. 5E illustrate relationships between the nozzle 106 (the opening 105) and the tool trace TP at respective time points t30, t31, t33, and t34 illustrated in FIG. 9.

The cutting processing machine 1, at the time point t30 illustrated in FIG. 9, starts controlling the tool trace TP. At the time point t30, the nozzle 106 and the tool trace TP are in a stopped state. At the time point t30, as illustrated in FIG. 5A, the control center point CL of the tool trace TP matches the nozzle center point CN.

The cutting processing machine 1 controls the tool trace TP such that the control center point CL is displaced relative to the nozzle center point CN in the advancement direction DT of the cutting processing. The cutting processing machine 1, at the time point t30, starts controlling the tool trace TP such that the control center point CL moves in the advancement direction DT with the fifth acceleration AR5. The cutting processing machine 1, at the time point t30, drives the X-axis carriage 102 and the Y-axis carriage 103 such that the nozzle center point CN moves in the advancement direction DT of the cutting processing with a sixth acceleration AR6 (AR6<AR5).

At the time point t31 following the time point t30, the tool trace TP (the control center point CL) is in the middle of movement with the fifth acceleration AR5 in the advancement direction DT and the nozzle 106 (the nozzle center point CN) is in the middle of movement with the sixth acceleration AR6 in the advancement direction DT. At the time point t31, as illustrated in FIG. 5B, the distance DL from the nozzle center point CN to the control center point CL on the control center trace LT is less than half of the offset amount ST (DL<½×ST). The distance DL corresponds to the displacement amount of the control center point CL relative to the nozzle center point CN on the control center trace LT.

At the time point t32 following the time point t31, the cutting processing machine 1 causes the tool trace TP (the control center point CL) moving with the fifth acceleration AR5 to be moved in the advancement direction DT at the predetermined speed (at the constant speed) PS. At the time point t32, the nozzle 106 is in the middle of movement in the advancement direction DT with the sixth acceleration AR6.

At the time point t33 following the time point t32, the tool trace TP (the control center point CL) is in the middle of movement at the predetermined speed PS in the advancement direction DT and the nozzle 106 (the nozzle center point CN) is in the middle of movement with the sixth acceleration AR6 in the advancement direction DT. At the time point t33, as illustrated in FIG. 5D, the distance DL from the nozzle center point CN to the control center point CL on the control center trace LT is longer than the half of the offset amount ST and is shorter than the offset amount ST (½×ST<D L<ST).

At the time point t34 following the time point t33, as illustrated in FIG. 5E, the distance DL from the nozzle center point CN to the control center point CL matches the offset amount ST. That is, the control center point CL is in a state to be displaced relative to the nozzle center point CN by the offset amount ST in the advancement direction DT of the cutting processing.

The cutting processing machine 1, at the time point t34, causes the nozzle 106 (the nozzle center point CN) moving with the sixth acceleration AR6 to be moved in the advancement direction DT at the predetermined speed PS. At the time point t34 or thereafter, the cutting processing machine 1 keeps the offset amount ST between the nozzle 106 and the tool trace TP constant and causes the nozzle 106 and the tool trace TP to be moved in the advancement direction DT at the same speed PS. Accordingly, the cutting processing machine 1, at the time point t34 or thereafter, performs the cutting processing to the processing object W in a state where the offset amount ST between the tool trace TP (the control center point CL) and the nozzle 106 (the nozzle center point CN) is kept constant.

Figure 10:
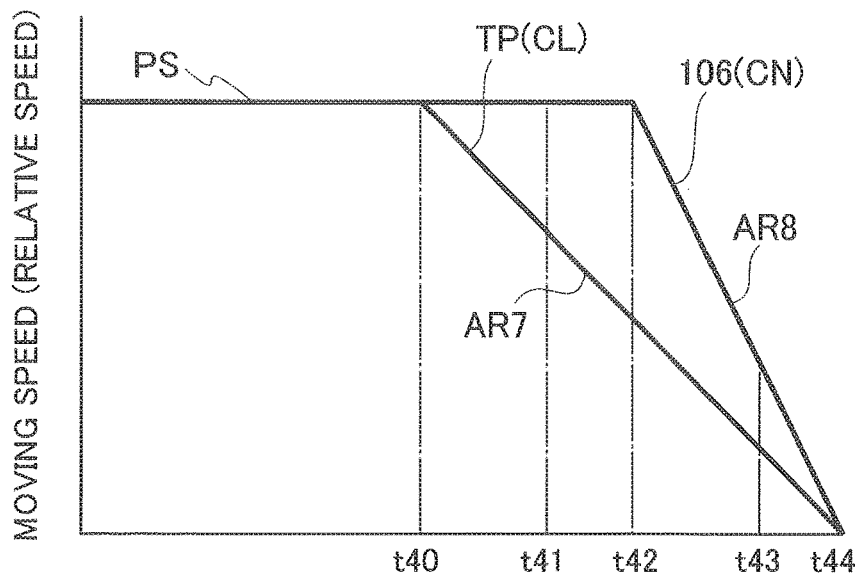
FIG. 10 is a diagram illustrating a relationship between a moving speed of a nozzle and a moving speed of a tool trace at the time of ending controlling the tool trace.

FIG. 10 illustrates a relationship between a moving speed of the nozzle 106 (specifically, the nozzle center point CN) and a moving speed of the tool trace TP (specifically, the control center point CL) at the end of the control of the tool trace TP. In FIG. 10, a vertical axis represents the moving speed (the relative speed) of the nozzle 106 (the nozzle center point CN) and the moving speed (the relative speed) of the tool trace TP (the control center point CL), and a horizontal axis represents a time axis. FIG. 10 corresponds to FIG. 6 or FIG. 9.

FIG. 5E, FIG. 5D, FIG. 5B, and FIG. 5A illustrate relationships between the nozzle 106 (the opening 105) and the tool trace TP at respective time points t40, t41, t43 and t44 illustrated in FIG. 10.

During a time period from the time point t34 illustrated in FIG. 9 to the time point t40 illustrated in FIG. 10, as illustrated in FIG. 5E, the cutting processing machine 1 keeps the offset amount ST between the nozzle 106 (the nozzle center point CN) and the tool trace TP (the control center point CL) constant and causes the nozzle 106 (the nozzle center point CN) and the tool trace TP (the control center point CL) to be moved in the advancement direction DT at the same speed PS.

During a time period from the time point t34 to the time point t40, the distance DL from the nozzle center point CN to the control center point CL matches the offset amount ST. That is, during a time period from the time point t34 to the time point t40, the cutting processing machine 1 performs the cutting processing to the processing object W in a state where the offset amount ST between the tool trace TP (the control center point CL) and the nozzle 106 (the nozzle center point CN) is kept constant.

The cutting processing machine 1, at the time point t40, causes the tool trace TP (the control center point CL) moving at the predetermined speed PS to be deaccelerated in the advancement direction DT with a seventh acceleration AR7 that is a negative acceleration. At the time point t40, the nozzle 106 is in the middle of movement at the predetermined speed PS in the advancement direction DT.

At the time point t41 following the time point t40, the nozzle 106 is in the middle of movement at the predetermined speed PS in the advancement direction DT and the tool trace TP is in the middle of deceleration with the seventh acceleration AR7 in the advancement direction DT. At the time point t41, as illustrated in FIG. 5D, the distance DL from the nozzle center point CN to the control center point CL on the control center trace LT is longer than the half of the offset amount ST and is shorter than the offset amount ST (½×ST<DL<ST). The distance DL corresponds to the displacement amount of the control center point CL relative to the nozzle center point CN on the control center trace LT.

At the time point t42 following the time point t41, the cutting processing machine 1 causes the nozzle 106 moving at the predetermined speed PS to be deaccelerated in the advancement direction DT with an eighth acceleration AR8 that is a negative acceleration. At the time point t42, the tool trace TP is in the middle of deceleration with the seventh acceleration AR7 in the advancement direction DT.

At the time point t43 following the time point t42, the tool trace TP is in the middle of deceleration with the seventh acceleration AR7 in the advancement direction DT and the nozzle 106 is in the middle of deceleration with the eighth acceleration AR8 in the advancement direction DT. At the time point t43, as illustrated in FIG. 5B, the distance DL from the nozzle center point CN to the control center point CL on the control center trace LT is less than the half of the offset amount ST (DL<½×ST).

At the time point t44 following the time point t43, as illustrated in FIG. 5A, a state becomes a state in which the control center point CL of the tool trace TP matches the nozzle center point CN that is an initial state. The cutting processing machine 1, at the time point t44, causes the laser beam oscillation to be stopped and causes the irradiation of the processing object W with a laser beam to be stopped. The cutting processing machine 1, at the time point t44, causes the movement of the nozzle 106 to be stopped and ends the cutting processing performed to the processing object W.

In a case where the processing condition CP is set with the offset amount ST between a control center point of a tool trace and a center point of a nozzle, the cutting processing machine 1 performs the cutting processing to the processing object W in a state where the tool trace TP is displaced relative to the nozzle center point CN in accordance with the offset amount ST in the advancement direction DT of the cutting processing. Therefore, as illustrated in FIG. 7 and FIG. 8, it is possible to increase the amount of assist gas AG acting to the molten metal Wmelt generated to the rear side of the advancement direction DT of the cutting processing. This can improve discharge properties of the molten metal Wmelt.

Figure 11A:
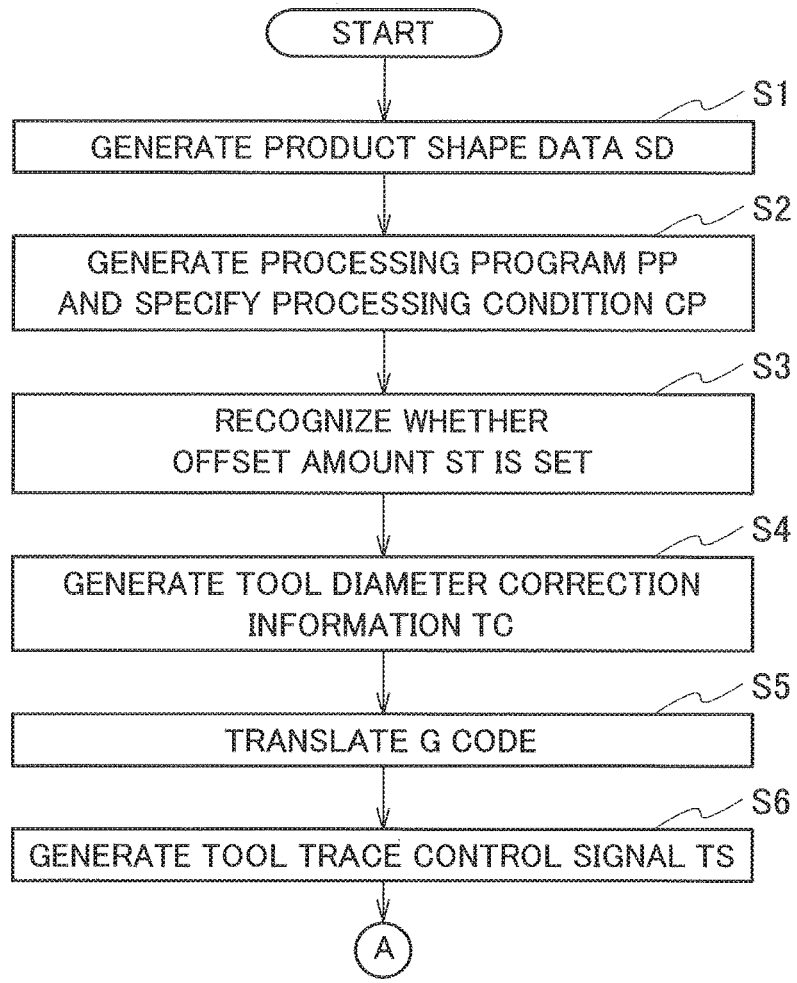
FIG. 11A is a flowchart illustrating an example of a cutting processing method according to an embodiment.
Figure 11B:
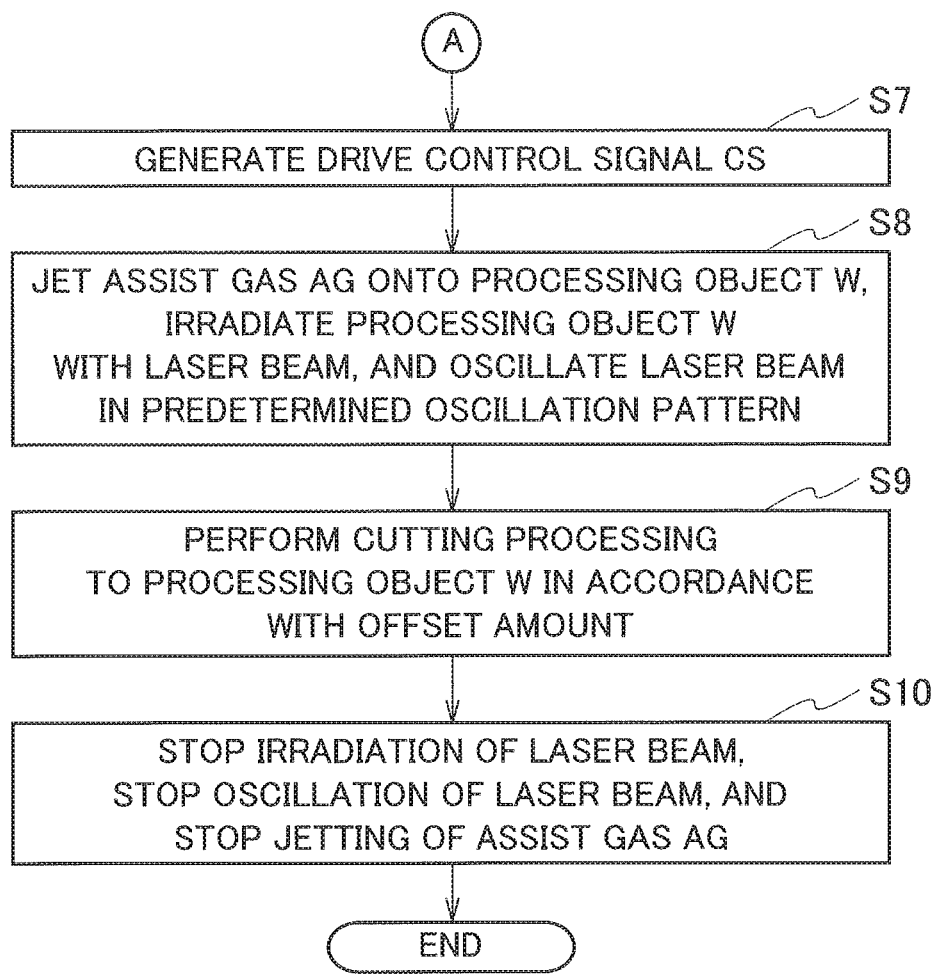
FIG. 11B is a flowchart illustrating an example of a cutting processing method according to an embodiment.

With reference to flowcharts illustrated in FIG. 11A and FIG. 11B, an example of the method for performing the cutting processing to the processing object W by the cutting processing machine 1 is described. In step S1 of the flowchart illustrated in FIG. 11A, a CAD device 20 generates product shape data SD based on product shape information indicating a size and a shape of a final processed product. The CAD device 20 outputs the product shape data SD to the CAM device 21.

In step S2, the CAM device 21, based on the product shape data SD, generates the processing program PP (including the G code) of the cutting processing machine 1 and specifies the processing condition CP. The CAM device 21 outputs the processing program PP and the processing condition CP to the NC device 200 in the cutting processing machine 1.

In step S2, the tool radius compensation amount calculator 201 and the processing trace calculator 202 in the NC device 200 receive, from the CAM device 21, the processing program PP and the processing condition CP. The tool radius compensation amount calculator 201, in step S3, recognizes whether, as the processing condition CP, the offset amount ST between the control center point CL of the tool trace TP and the nozzle center point CN is set.

In a case where it is recognized that the offset amount ST is not set as the processing condition CP, the tool radius compensation amount calculator 201, in step S4, generates the tool radius compensation information TC in which the control center point CL of the tool trace TP matches the nozzle center point CN. Alternatively, in a case where it is recognized that, as the processing condition CP, the offset amount ST is set, the tool radius compensation amount calculator 201, in step S4, generates the tool radius compensation information TC in which the control center point CL of the tool trace TP is displace by the offset amount ST relative to the nozzle center point CN in the advancement direction DT of the cutting processing. Further, the tool radius compensation amount calculator 201 outputs the tool radius compensation information TC to the processing trace calculator 202.

The processing trace calculator 202, in step S2, receives the processing program PP and the processing condition CP from the CAM device 21 and, in step S4, receives the tool radius compensation information TC from the tool radius compensation amount calculator 201. The processing trace calculator 202, in step S5, translates the G code included in the processing program PP. Further, the processing trace calculator 202, based on the translation result, determines the cutting processing correction condition of either one of a case where the cutting processing is performed in the left-side tool radius compensation and a case where the cutting processing is performed in the right-side tool radius compensation.

The processing trace calculator 202, in step S6, generates the tool trace control signal TS for displacing the control center point CL relative to the nozzle center point CN by the offset amount ST in the advancement direction DT of the cutting processing based on the processing program PP, the processing condition CP, the tool radius compensation information TC, and the determined cutting processing correction condition. Further, the processing trace calculator 202 outputs the tool trace control signal TS to the driving controller 203.

In step S7 of the flowchart illustrated in FIG. 11B, the driving controller 203, based on the tool trace control signal TS, generates the drive control signal CS for controlling the processing machine body 100. Further, the driving controller 203 outputs the drive control signal CS to the processing machine body 100.

The NC device 200, in step S8, controls the laser oscillator 10, the processing machine body 100, and the assist gas supply device 400. Accordingly, the processing unit 104 in the processing machine body 100 jets, onto the processing object W, the assist gas AG supplied from the assist gas supply device 400 through the opening 105 of the nozzle 106, the processing object W is irradiated with a laser beam emitted from the laser oscillator 10, and the tool trace controller 300 causes the laser beam to be oscillated in a predetermined oscillation pattern.

Each operation timing of the laser oscillator 10, the processing machine body 100, and the assist gas supply device 400 is controlled by the NC device 200 based on the processing program PP and the processing condition CP.

The processing machine body 100, in step S9, causes the nozzle 106 to be moved and performs the cutting processing to the processing object W in a state where the tool trace TP is displaced relative to the nozzle center point CN in accordance with the offset amount ST in the advancement direction DT of the cutting processing.

The NC device 200, in step S10, controls the laser oscillator 10, the processing machine body 100, and the assist gas supply device 400. The tool trace controller 300 in the processing machine body 100 stops the laser beam oscillation. The laser oscillator 10 stops the emission of the laser beam. The assist gas supply device 400 stops the supply of the assist gas AG to the processing machine body 100. The cutting processing machine 1 ends the cutting processing performed to the processing object W.

In accordance with the cutting processing machine and the cutting processing method according to the present embodiment, generated is the tool radius compensation information TC including correction information based on the tool trace TP and correction information based on the nozzle trace NP. In accordance with the cutting processing machine and the cutting processing method according to the present embodiment, the nozzle trace NP and the tool trace TP are controlled by, based on the tool radius compensation information TC, controlling the drive of the processing unit 104 and the drive of the tool trace controller 300. Accordingly, in accordance with the cutting processing machine and the cutting processing method according to the present embodiment, a tool diameter of a cutting tool can be corrected highly precisely even in a case where the tool trace corresponding to the cutting tool or the cutting processing trace in a state where a relative position between a nozzle and a processing stage is fixed has a noncircular shape.

The processing condition CP sometimes includes the tool trace control information set with the offset amount between a control center point of a tool trace and a center point of the nozzle 106. In accordance with the cutting processing machine and the cutting processing method according to the present embodiment, in a case where the processing condition CP does not include the tool trace control information, generated is the tool radius compensation information TC in which the control center point CL of the tool trace TP matches the nozzle center point CN.

In accordance with the cutting processing machine and the cutting processing method according to the present embodiment, in a case where the processing condition CP includes the tool trace control information, generated is the tool radius compensation information TC for causing the control center point CL of the tool trace TP to be displace by the offset amount ST relative to the nozzle center point CN in the advancement direction DT of the cutting processing.

Accordingly, in accordance with the cutting processing machine and the cutting processing method according to the present embodiment, it is possible to increase the amount of assist gas AG acting to the molten metal Wmelt generated to the rear side of the advancement direction DT because the cutting processing is performed to the processing object W in a state where the tool trace TP is displaced relative to the nozzle center point CN in accordance with the offset amount ST in the advancement direction DT of the cutting processing. This can improve discharge properties of the molten metal Wmelt.

The present invention is not limited to the present embodiments described above, and various modifications are possible within a scope not departing from a scope of the present invention. The cutting processing machine and the cutting processing method according to the present embodiment have been described by taking a laser processing machine and a laser processing method as examples, but the present invention is also applicable to, for example, a water jet processing device.

The disclosure of the present application is related to the subject matter described in Japanese Patent Application No. 2018-044118 filed on Mar. 12, 2018, the entire contents of which are incorporated herein by reference.

The invention claimed is:

1. A cutting processing machine comprising:
   a processing machine body configured to perform cutting processing with a laser beam to a processing object; and
   an NC device configured to control the processing machine body; wherein
   the NC device comprises:
   a tool radius compensation amount calculator configured to generate tool radius compensation information for correcting a tool diameter of a cutting tool used for performing the cutting processing to the processing object based on a processing program and a processing condition set based on product shape information indicating a size and a shape of a final processed product obtained by performing the cutting processing to the processing object;
   a processing trace calculator configured to generate a tool trace control signal based on the processing program, the processing condition, and the tool radius compensation information; and
   a driving controller configured to generate a drive control signal for controlling the processing machine body based on the tool trace control signal; wherein
   the processing machine body comprises:
   a processing unit including a tip attached with a nozzle configured to perform the cutting processing to the processing object by changing a position relative to the processing object; and
   a tool trace controller configured to control a tool trace that corresponds to the cutting tool and includes a noncircular shape based on the drive control signal, the tool trace forming a shape obtained by oscillating the laser beam in a noncircular oscillation pattern; wherein
   the tool trace controller is configured to set, as the processing condition, an offset amount between a control center point that is a reference for controlling the tool trace and a center point of the nozzle;
   the processing trace calculator is configured to generate the tool trace control signal for displacing the control center point relative to the center point of the nozzle by the offset amount in a predetermined direction; and
   the processing machine body is configured to control the tool trace based on the drive control signal such that the control center point is displaced relative to the center point of the nozzle in the predetermined direction.

2. The cutting processing machine according to claim 1, wherein
   the processing machine body is controlled by the NC device and further comprises a laser oscillator configured to emit a laser beam;
   the nozzle includes an opening through which the laser beam is emitted to irradiate the processing object therewith; and
   the tool trace controller is housed in the processing unit and controls the tool trace by causing the laser beam emitted through the opening to be oscillated in the noncircular oscillation pattern.

3. The cutting processing machine according to claim 2, further comprising:
   an assist gas supply device configured to supply, to the processing machine body, assist gas that discharges molten metal of the processing object melted by heat generated from the laser beam, wherein the processing unit jets the assist gas onto the processing object through the opening of the nozzle.

4. A cutting processing method comprising:

generating tool radius compensation information for correcting a tool diameter of a cutting tool used for performing cutting processing with a laser beam to a processing object based on a processing program and a processing condition set based on product shape information indicating a size and a shape of a final processed product obtained by performing the cutting processing to the processing object;

generating a tool trace control signal based on the processing program, the processing condition, and the tool radius compensation information; and generating a drive control signal based on the tool trace control signal; wherein as the processing condition, an offset amount between a center point of a nozzle for performing the cutting processing to the processing object and a control center point that is a reference for controlling a tool trace that corresponds to the cutting tool is set, the tool trace forming a shape obtained by oscillating the laser beam in a noncircular oscillation pattern;

generating the tool trace control signal for displacing the control center point relative to the center point of the nozzle by the offset amount in a predetermined direction; and controlling the tool trace based on the drive control signal such that the control center point is displaced relative to the center point of the nozzle in the predetermined direction.

5. The cutting processing method according to claim 4, further comprising:

emitting a laser beam through an opening formed to a tip portion of the nozzle and irradiating the processing object with the laser beam; and controlling the tool trace by causing the laser beam to be oscillated in the noncircular oscillation pattern.

6. The cutting processing method according to claim 5, further comprising:

jetting assist gas onto the processing object and discharging molten metal of the processing object melted by heat generated from the laser beam.

7. The cutting processing method according to claim 4, wherein oscillating the laser beam in a noncircular oscillation pattern includes oscillating the laser beam at about 1000 Hz or greater.

8. The cutting processing machine according to claim 1, wherein the tool trace controller is configured to oscillate the laser beam at about 1000 Hz or greater.

* * * * *